US008835551B2

(12) United States Patent
Fukushi et al.

(10) Patent No.: US 8,835,551 B2
(45) Date of Patent: Sep. 16, 2014

(54) ULTRA LOW VISCOSITY IODINE CONTAINING AMORPHOUS FLUOROPOLYMERS

(75) Inventors: Tatsuo Fukushi, Woodbury, MN (US); Peter J. Scott, Madison, AL (US); Cynthia N. Ferguson, Huntsville, AL (US); Werner M. A. Grootaert, Oakdale, MN (US); Denis Duchesne, Woodbury, MN (US); Yeng Moua, West Saint Paul, MN (US); Larry A. Last, Moulton, AL (US); Terri A. Shefelbine, Saint Paul, MN (US); Luke M. B. Rodgers, Inver Grove Heights, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 694 days.

(21) Appl. No.: 12/677,198

(22) PCT Filed: Sep. 11, 2008

(86) PCT No.: PCT/US2008/075966
§ 371 (c)(1),
(2), (4) Date: Jul. 30, 2010

(87) PCT Pub. No.: WO2009/036131
PCT Pub. Date: Mar. 19, 2009

(65) Prior Publication Data
US 2010/0286329 A1    Nov. 11, 2010

Related U.S. Application Data

(60) Provisional application No. 60/972,624, filed on Sep. 14, 2007, provisional application No. 60/972,627, filed on Sep. 14, 2007.

(51) Int. Cl.
*C08F 214/22*   (2006.01)
*C08F 214/28*   (2006.01)
*C09D 127/16*   (2006.01)
*C08F 14/16*    (2006.01)
*C08F 14/18*    (2006.01)
*C08F 214/16*   (2006.01)
*C08F 214/18*   (2006.01)

(52) U.S. Cl.
CPC ............ *C09D 127/16* (2013.01); *C08F 214/22* (2013.01); *C08F 214/28* (2013.01); *C08F 14/16* (2013.01); *C08F 14/18* (2013.01); *C08F 214/16* (2013.01); *C08F 214/18* (2013.01)
USPC ........... 524/546; 524/544; 524/545; 524/805; 525/199; 525/200; 526/206; 526/247; 526/249; 526/254; 526/255; 526/296; 526/348.8

(58) Field of Classification Search
CPC .................... C08F 214/22; C08F 214/28
USPC ........... 524/544, 545, 546, 805; 525/199, 200
See application file for complete search history.

(56) References Cited

U.S. PATENT DOCUMENTS

| 2,364,607 A | 1/1939 | Dreher |
| 2,559,752 A | 7/1951 | Berry |
| 3,876,654 A | 4/1975 | Pattison |
| 4,233,421 A | 11/1980 | Worm |
| 4,243,770 A | 1/1981 | Tatemoto |
| 4,361,678 A | 11/1982 | Tatemoto |
| 4,621,116 A | 11/1986 | Morgan |
| 4,910,390 A * | 3/1990 | Barrett et al. ................. 219/548 |
| 4,912,171 A | 3/1990 | Grootaert |
| 4,943,622 A | 7/1990 | Naraki |
| 4,948,852 A | 8/1990 | Moore |
| 4,948,853 A | 8/1990 | Logothetis |
| 4,983,697 A | 1/1991 | Logothetis |
| 5,086,123 A | 2/1992 | Guenthner |
| 5,117,055 A | 5/1992 | Abe |
| 5,225,504 A | 7/1993 | Tatsu |
| 5,262,490 A | 11/1993 | Kolb |
| 5,268,405 A | 12/1993 | Ojakaar |
| 5,285,002 A | 2/1994 | Grootaert |
| 5,378,782 A | 1/1995 | Grootaert |
| 5,442,097 A | 8/1995 | Obermeier |
| 5,591,804 A | 1/1997 | Coggio |

(Continued)

FOREIGN PATENT DOCUMENTS

| CA | 2268072 | 4/1998 |
| EP | 0683149 | 11/1995 |

(Continued)

OTHER PUBLICATIONS

Kishine, "Introduction to Peroxide Curable Ultra Low Viscosity FKM Technology", Rubber Division, Am. Chem. Soc., Columbus, OH, Oct. 5-8, 2004, Daikin Industries, 11 pages.
Oka, "Vinylidene Fluoride—Hexafluoropropylene Copolymer Having Terminal Iodines", Contemporary Topics in Polymer Science, 1984, vol. 4, pp. 763-777.
Pocius, Adhesion and Adhesives Technology, Hanser/Gardner Publishers, Inc., Cincinnati, OH, 1997, p. 231.
Extended EP Search Report for Application PCT/US2008/075966, 10 pages, Sep. 22, 2010.
International Search Report for PCT/US2008/075966; 3 pgs, Mar. 31, 2009.
Written Opinion for PCT/US2008/075966, 4 pages, Mar. 30, 2009.
ASTM D1646-06 Type A.

*Primary Examiner* — Nicole M Buie-Hatcher
(74) *Attorney, Agent, or Firm* — C. Michael Geise

(57) ABSTRACT

Iodine containing amorphous fluoropolymers having at least one fluoropolymer with a cure site, where the fluoropolymer has a Mooney viscosity of 2 or less (ML 1+10) at 100° C. according to ASTM D1646, and a peel strength to a roll mill of 10 dN/cm or less and methods for making such iodine containing amorphous fluoropolymers are described. Articles derived from the cured product of such iodine containing amorphous fluoropolymers are also described. Solutions, dispersions and coatings derived from such iodine containing amorphous fluoropolymers are also described.

16 Claims, 1 Drawing Sheet

(56) References Cited

U.S. PATENT DOCUMENTS

| | | | |
|---|---|---|---|
| 5,625,019 A | 4/1997 | Arcella | |
| 5,765,692 A | 6/1998 | Schenz | |
| 5,852,125 A | 12/1998 | Krüger | |
| 5,929,169 A | 7/1999 | Jing | |
| 6,429,258 B1 | 8/2002 | Morgan | |
| 6,613,941 B1 | 9/2003 | Felix | |
| 6,642,331 B2 | 11/2003 | Apostolo | |
| 6,646,046 B2 | 11/2003 | Contrada | |
| 6,646,077 B1 | 11/2003 | Lyons | |
| 6,677,414 B2 | 1/2004 | Hintzer | |
| 6,706,193 B1 | 3/2004 | Burkard | |
| 6,720,360 B1 | 4/2004 | Grootaert | |
| 6,743,874 B2 | 6/2004 | Harrison | |
| 6,794,550 B2 | 9/2004 | Hintzer | |
| 6,899,933 B2 | 5/2005 | Bean | |
| 7,018,541 B2 | 3/2006 | Hintzer | |
| 7,138,470 B2 | 11/2006 | Fukushi | |
| 8,193,308 B2 * | 6/2012 | Irie et al. | 528/502 R |
| 2003/0111519 A1 | 6/2003 | Kinney | |
| 2003/0119993 A1 | 6/2003 | Apostolo | |
| 2005/0124773 A1 | 6/2005 | Tang | |
| 2005/0159557 A1 * | 7/2005 | Fukushi et al. | 525/326.3 |
| 2005/0250910 A1 * | 11/2005 | Cheng et al. | 525/222 |
| 2006/0008304 A1 * | 1/2006 | Kitano | 399/333 |
| 2006/0199898 A1 | 9/2006 | Funaki | |
| 2006/0223924 A1 | 10/2006 | Tsuda | |
| 2006/0281946 A1 | 12/2006 | Morita | |
| 2007/0015864 A1 | 1/2007 | Hintzer | |
| 2007/0015865 A1 | 1/2007 | Hintzer | |
| 2007/0060699 A1 | 3/2007 | Tsuda | |
| 2007/0072973 A1 | 3/2007 | Funaki | |
| 2007/0100062 A1 | 5/2007 | Lyons | |
| 2007/0117915 A1 | 5/2007 | Funaki | |
| 2007/0142513 A1 | 6/2007 | Tsuda | |
| 2007/0142541 A1 | 6/2007 | Hintzer | |
| 2008/0306195 A1 | 12/2008 | Irie | |

FOREIGN PATENT DOCUMENTS

| | | |
|---|---|---|
| EP | 929584 | 7/1999 |
| EP | 1308467 | 5/2003 |
| JP | 63-304009 | 12/1988 |
| JP | 06-331040 | 11/1994 |
| JP | 2003/137930 | 5/2003 |
| WO | WO 98/15583 | 4/1998 |
| WO | WO 02/24770 | 3/2002 |
| WO | WO 02/28925 | 4/2002 |
| WO | WO 2006011547 A1 * | 2/2006 |
| WO | WO 2006118247 A1 * | 11/2006 |
| WO | WO 2007/049517 | 3/2007 |

\* cited by examiner

ULTRA LOW VISCOSITY IODINE CONTAINING AMORPHOUS FLUOROPOLYMERS

CROSS REFERENCE TO RELATED APPLICATIONS

This application is a national stage filing under 35 U.S.C. §371 of PCT/US2008/075966, filed Sep. 11, 2008, which claims priority to U.S. Provisional Application Nos. 60/972,624 and 60/972,627, both filed Sep. 14, 2007, the disclosure of which is incorporated by reference in its/their entirety herein.

BACKGROUND

The present disclosure relates to iodine containing amorphous fluoropolymers having ultra low viscosity and improved processability, a method of making such iodine containing amorphous fluoropolymers, cured articles derived from such iodine containing amorphous fluoropolymers, and solutions, dispersions and coatings derived from such iodine containing amorphous fluoropolymers.

SUMMARY

In one aspect, the present disclosure provides an iodine containing amorphous fluoropolymer having a first fluoropolymer with a cure site. The first fluoropolymer has a storage modulus at 25° C. and 6.3 rad/s of greater than or equal to 300 kPa and at 25° C. and 0.1 rad/s of less than or equal to 200 kPa.

In some embodiments, the iodine containing amorphous fluoropolymer has a Mooney viscosity of 4 or less (ML 1+10) at 100° C. according to ASTM D1646-06 TYPE A, and a peel strength to a roll mill of 10 dN/cm or less. In some embodiments, the iodine containing amorphous fluoropolymer has a Mooney viscosity of 2 or less (ML 1+10) at 100° C. according to ASTM D1646-06 TYPE A, and a peel strength to a roll mill of 10 dN/cm or less.

In some embodiments, the cure site of the first fluoropolymer in the iodine containing amorphous fluoropolymer is an end group. The cure site end group may be an iodine group with a weight percent of iodine ranging from 0.2 wt. % to 2 wt. %, and even from 0.3 wt. % to 1 wt. %. In some embodiments, the iodine is derived from an iodinated chain transfer agent of the formula: $RI_x$, where (i) R is a perfluoroalkyl or chloroperfluoroalkyl group having 3 to 12 carbon atoms; and (ii) x=1 or 2. The chain transfer agent may be a pet-fluorinated iodo-compound.

In some embodiments, the iodine containing amorphous fluoropolymer has at least one cure site monomer. The cure site monomer may be selected from $CH_2$=CHI, $CF_2$=CHI, $CF_2$=CFI, $CH_2$=CHCH$_2$I, $CF_2$=CFCF$_2$I, $CH_2$=CHCF$_2$CF$_2$I, $CF_2$=CFCH$_2$CH$_2$I, $CF_2$=CFCF$_2$CF$_2$I, $CH_2$=CH(CF$_2$)$_6$CH$_2$CH$_2$I, $CF_2$=CFOCF$_2$CF$_2$I, $CF_2$=CFOCF$_2$CF$_2$CF$_2$I, $CF_2$=CFOCF$_2$CF$_2$CH$_2$I, $CF_2$=CFCF$_2$OCH$_2$CH$_2$I, $CF_2$=CFO(CF$_2$)$_3$—OCF$_2$CF$_2$I, $CH_2$=CHBr, $CF_2$=CHBr, $CF_2$=CFBr, $CH_2$=CHCH$_2$Br, $CF_2$=CFCF$_2$Br, $CH_2$=CHCF$_2$CF$_2$Br, $CF_2$=CFOCF$_2$CF$_2$Br, and mixtures thereof.

The iodine containing amorphous fluoropolymer may also include cure system selected from a peroxide cure system, a polyol cure system, an amine cure system, and a mixture thereof. The iodine containing amorphous fluoropolymer may further include a filler.

In some embodiments, the iodine containing amorphous fluoropolymer may also include at least a second amorphous fluoropolymer having a Mooney viscosity of greater than 2 (ML 1+10) at 100° C. according to ASTM D1646-06 TYPE A. The fluoropolymers, including first fluoropolymer, second fluoropolymer, and the like, may include interpolymerized units derived from tetrafluoroethylene, vinylidene fluoride, hexafluoropropylene, ethylene, propylene, perfluoro(alkylvinylether), perfluoro(allylether), chlorotrifluoroethylene, vinylfluoride, trifluoroethylene, and mixtures thereof.

In another aspect of the present disclosure, there is provided a method of making an amorphous fluoropolymer including (a) providing at least one fluorine containing monomer; (b) providing an initiator capable of producing free radicals; (c) optionally, providing an emulsifier; and (d) polymerizing at least one fluorine containing monomer in an aqueous emulsion polymerization in the presence of an iodinated chain transfer agent, where the iodinated chain transfer agent is continuously fed into a polymerization vessel. The initiator may be peroxy disulfate. In some embodiments, continuous feeding of the iodinated chain transfer agent is achieved by continuously feeding a blend of the iodinated chain transfer agent in one or more monomers.

In still another aspect of the present disclosure, there is provided a cured article derived from a fluoroelastomer having an amorphous fluoropolymer with storage modulus at 25° C. and 6.3 rad/s of greater than or equal to 300 kPa and at 25° C. and 0.1 rad/s of less than or equal to 200 kPa.

In some embodiments, the amorphous fluoropolymer is formed by emulsifier-free polymerization. In other embodiments, the amorphous fluoropolymer is polymerized with a buffer or ammonium hydroxide. In some embodiments, the amorphous fluoropolymer is coagulated by shear or salt. In other embodiments, the amorphous fluoropolymer is coagulated with adding salt and ammonium hydroxide. Still other embodiments include solutions, dispersions and coatings derived from an amorphous fluoropolymer with storage modulus at 25° C. and 6.3 rad/s of greater than or equal to 300 kPa and at 25° C. and 0.1 rad/s of less than or equal to 200 kPa.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
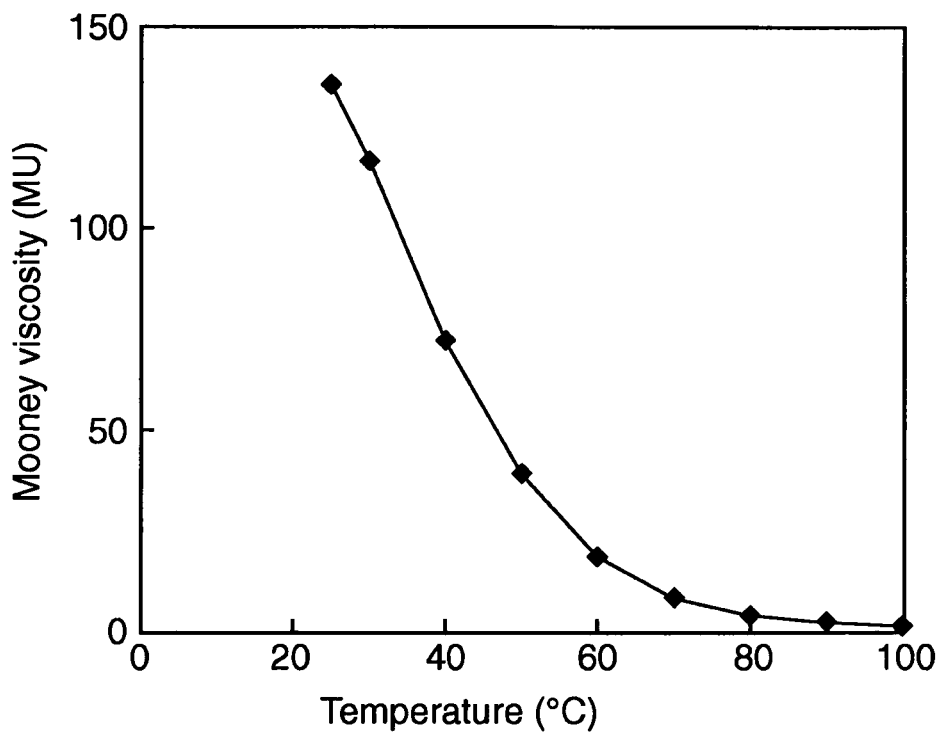
FIG. 1 is a plot showing the Mooney viscosity as a function of the temperature of the iodine containing amorphous fluoropolymer.

There is a general desire for improved processability of elastomers used in the fluoroelastomer industry. Lower viscosities of elastomers result in simplified processing technology and increased productivity. Increased productivity is especially important because elastomers, particularly fluoroelastomers, are expensive. Because of their relatively high viscosities, current fluoroelastomers have a limitation in processing on injection molding machines used in the elastomer industry.

Fluoroelastomers with Mooney viscosities (ML.1+10 at 121° C.) greater than 60 can generally be processed only by compression molding. Fluoroelastomers with Mooney viscosities less than or equal to 60 can be processed on special injection molding machines, however this requires long cycle times and also produces a considerable amount of waste (flash-out).

Known fluoroelastomers with Mooney viscosities (ML1+10 at 121° C.) of 30 to 60 Mooney units can be processed according to this principle into press moldings. However, the viscosity is still high for injection molding.

In general the viscosity of fluoroelastomers is very high compared to non-fluorocarbon elastomers, e.g. silicone elastomers. Mooney viscosities (ML 1+10@121° C.) of most of fluoroelastomers are from 30 to 60. Because of the high viscosity, fluoroelastomer compounds are difficult to process and mold, e.g. injection molding. Low viscosity and ultra low viscosity can be categorized as in Table 1.

TABLE 1

Typical Viscosity

| Mooney viscosity ML 1 + 10 | | | |
|---|---|---|---|
| 100° C. | 121° C. | Typical Viscosity | Typical Process |
| >90 | >60 | High viscosity | compression molding |
| 50-90 | 30-60 | Medium viscosity | Transfer/compression molding |
| 20-50 | 10-30 | Low viscosity | injection molding |
| 0-20 | 0-10 | Ultra low viscosity | injection molding |
| NA | NA | Liquid fluoroelastomer | liquid injection molding |

The present disclosure is directed to ultra low viscosity iodine containing amorphous fluoropolymers that are suitable for use in milling and molding applications. The ultra low viscosity iodine containing amorphous fluoropolymer is generally a multicomponent compound having at least one fluoropolymer with a Mooney viscosity of 2 or less (ML 1+10) at 100° C. according to ASTM D1646-06 TYPE A. The compound also contains a curing agent. The compound may include one or more fluoropolymers with a Mooney viscosity of greater than 2 (ML 1+10) at 100° C. according to ASTM D1646-06 TYPE A. The compound may also include one or more conventional adjuvants, such as, for example, fillers, acid acceptors, process aids, or colorants.

It is generally known that low viscosity polymers have poor physical properties, such as compression set resistance. However, the elastomers presently disclosed have low molecular weights resulting in low viscosities. These elastomers exhibit unexpected results because finished articles derived from these elastomers exhibit excellent physical properties, including compression set resistance and tensile strength.

Elastomers are typically compounded using a two-roll mill. Generally, low viscosity polymers or compounds are easy to process. However, if the viscosity of raw or compounded gum is too low, raw or compounded gum sticks to the two-roll mill. It is difficult to remove the compound from the two-roll mill.

Tackiness of raw gum or compound can be directly measured on a roll mill by measuring peel strength to a two roll mill using a scale or transducer.

The presently disclosed ultra low viscosity iodine containing amorphous fluoropolymers have a peel strength to a roll mill of 10 dN/cm or less. If the peel strength is greater than 10 dN/cm, the raw gum or compound is difficult to mill and to remove from the roll.

Viscoelastic properties affect not only processability of polymer, but also tackiness and softness of raw gum and compound. The viscoelastic properties can be measured by dynamic mechanical analyzer. One well known technique for identifying tackiness is the Dahlquist criterion as described in Alphonsus V. Pocius, *Adhesion and Adhesives Technology*, p. 231, Hanser Gardner Publishers, Inc., Cincinnati, Ohio, 1997. This criterion has been used in designing a pressure sensitive adhesive (PSA) as described in U.S. Pat. No. 5,765, 692. An accepted quantitative description of a pressure sensitive adhesive is given by the Dahlquist criterion, which indicates that materials having a storage modulus (G') of less than about 300 kPa at 6.3 rad/s (1 Hz) have pressure sensitive adhesive properties while materials having a G' in excess of this value do not.

The fluoroelastomer of this invention is surprisingly soft compared to known fluoroelastomers. The softness can be described using a modulus at room temperature and low frequency by dynamic mechanical testing, such as ASTM D 6204-07 and D 6049-03. A storage modulus (0.1 rad/s and 25° C.) of the fluoroelastomer of this invention was almost the same as that of a silicone elastomer, which is well-known as a soft elastomeric material. If a material is soft, it is easy to process, e.g. mixing and compounding.

In some embodiments, the presently disclosed iodine containing amorphous fluoropolymer has a storage modulus (G') at 25° C. and 6.3 rad/s of greater than or equal to 300 kPa and at 25° C. and 0.1 rad/s of less than or equal to 200 kPa, and preferably a storage modulus (G') at 25° C. and 6.3 rad/s of greater than or equal to 400 kPa and at 25° C. and 0.1 rad/s of less than or equal to 100 kPa.

At least one of the fluoropolymers has an effective amount of cure sites, such that it has a Mooney viscosity of 4 or less (ML 1+10) at 100° C. according to ASTM D1646-06 TYPE A, and in some embodiments a Mooney viscosity of 2 or less (ML 1+10) at 100° C. according to ASTM D1646-06 TYPE A. The end groups are iodine end groups chemically bonded to chain ends of at least one of the fluoropolymers. The weight percent of iodine may range from about 0.2 wt. % to about 2 wt. %, and preferably from about 0.3 wt. % to about 1 wt. %.

The fluoropolymers presently disclosed may include one or more interpolymerized units derived from at least two principal monomers. Examples of suitable candidates for the principal monomer(s) include perfluoroolefins (e.g., tetrafluoroethylene (TFE) and hexafluoropropylene (HFP)), perfluorovinyl ethers (e.g., perfluoroalkyl vinyl ethers and perfluoroalkoxy vinyl ethers), perfluorovinyl ethers and hydrogen-containing monomers such as olefins (e.g., ethylene, propylene, and the like) and vinylidene fluoride (VDF). Such fluoropolymers include, for example, fluoroelastomer gums and semi-crystalline fluoroplastics.

Those skilled in the art are capable of selecting specific interpolymerized units at appropriate amounts to form an elastomeric polymer Thus, the appropriate level of interpolymerized units are based on mole %, are selected to achieve an elastomeric, polymeric composition.

When the fluoropolymer is perhalogenated, preferably perfluorinated, it contains at least 50 mole percent (mol %) of its interpolymerized units derived from TFE and/or CTFE, optionally including HFP. The balance of the interpolymerized units of the fluoropolymer (10 to 50 mol %) is made up of one or more perfluoro vinyl ethers and/or perfluoro vinyl ethers, and a suitable cure site monomer. An exemplary fluoropolymer is composed of principal monomer units of TFE and at least one perfluoroalkyl vinyl ether. In such copolymers, the copolymerized perfluorinated ether units constitute from about 10 to about 50 mol %, and preferably from about 15 to about 35 mol % of total monomer units present in the polymer.

When the fluoropolymer is not perfluorinated, it contains from about 5 mol % to about 90 mol % of its interpolymerized units derived from TFE, CTFE, and/or HFP, from about 5 mol % to about 90 mol % of its interpolymerized units derived from VDF, ethylene, and/or propylene, up to about 40 mol % of its interpolymerized units derived from a vinyl ether, and from about 0.1 mol % to about 5 mol %, and preferably from about 0.3 mol % to about 2 mol %, of a suitable cure site monomer.

Suitable perfluorinated ethers include those of the formula: $CF_2=CFO-(CF_2)_m-(O(CF_2)_p)_n-OR_f$ (Formula 1) wherein $R_f$ is a perfluorinated (C1-C4) alkyl group, m=1-4, n=0-6, and p=1-2, or $CF_2=CF(CF_2)_m-O-R_f$ (Formula 2) wherein: m=1-4; $R_f$ is a perfluorinated aliphatic group optionally containing O atoms. These perfluorinated ethers may be pre-emulsified with an emulsifier prior to its copolymerization with the other comonomers.

Exemplary perfluoroalkoxy vinyl ethers include, $CF_2=CFOCF_2CF_2OCF_3$, $CF_2=CFOCF_2CF_2CF_2CF_2OCF_3$, $CF_2=CFOCF_2OCF_2CF_3$, $CF_2=CFOCF_2CF_2OCF_2CF_3$, $CF_2=CFOCF_2CF_2CF_2OCF_2CF_3$, $CF_2=CFOCF_2CF_2CF_2CF_2OCF_2CF_3$, $CF_2=CFOCF_2CF_2OCF_2OCF_3$, $CF_2=CFOCF_2CF_2OCF_2CF_2OCF_3$, $CF_2=CFOCF_2CF_2OCF_2CF_2CF_2OCF_3$, $CF_2=CFOCF_2CF_2OCF_2CF_2CF_2CF_2OCF_3$, $CF_2=CFOCF_2CF_2OCF_2CF_2CF_2CF_2CF_2OCF_3$, $CF_2=CFOCF_2CF_2(OCF_2)_3OCF_3$, $CF_2=CFOCF_2CF_2(OCF_2)_4OCF_3$, $CF_2=CFOCF_2CF_2OCF_2OCF_2OCF_3$, $CF_2=CFOCF_2CF_2OCF_2CF_2CF_3$ and $CF_2=CFOCF_2CF_2OCF_2CF_2OCF_2CF_2CF_3$. Mixtures of perfluoroalkyl vinyl ethers and perfluoroalkoxy vinyl ethers may also be employed. Perfluoroolefins useful in the present disclosure include those of the formula: $CF_2=CF-R_f$, where $R_f$ is fluorine or a perfluoroalkyl of 1 to 8, preferably 1 to 3, carbon atoms. Exemplary formal containing perfluorovinylethers include $CF_2=CFOCF_2OCF_3$, $CF_2=CFOCF_2OCF_2CF_3$, $CF_2=CFOCF_2OCF_2CF_2CF_3$, $CF_2=CFOCF_2CF_2CF_2OCF_3$.

Exemplary perfluoroalkoxy allyl ethers include $CF_2=CFCF_2OCF_2CF_2OCF_3$, $CF_2=CFCF_2OCF_2CF_2CF_2OCF_3$ and $CF_2=CFCF_2OCF_2OCF_3$.

In some embodiments, partially-fluorinated monomers or hydrogen-containing monomers such as olefins (e.g., ethylene, propylene, and the like), and vinylidene fluoride can be used in the fluoropolymer. An exemplary partially fluorinated polymer includes principal monomer units of TFE and propylene, such as AFLAS® (commercially available from Asahi Glass Co. Ltd., Tokyo, Japan). Another exemplary partially fluorinated terpolymer having principal monomer units of tetrafluoroethylene, propylene and vinylidene fluoride, such as BRE 7231X (commercially available from Dyneon LLC, Minnesota, USA).

The amorphous fluoropolymer presently disclosed is created by a sequence of steps, including polymerization, coagulation/drying, milling, compounding, pre-forming, and curing/molding. In one embodiment, an aqueous emulsion polymerization can be carried out continuously under steady-state conditions. In this embodiment, for example, an aqueous emulsion of the perfluoro ethers of Formulas (1) and (2) as previously disclosed, and the other monomers, water, emulsifiers, buffers and catalysts are fed continuously to a stirred reactor under optimum pressure and temperature conditions while the resulting emulsion or suspension is continuously removed. In some embodiments, batch or semibatch polymerization is conducted by feeding the aforementioned ingredients into a stirred reactor and allowing them to react at a set temperature for a specified length of time or by charging ingredients into the reactor and feeding the monomers into the reactor to maintain a constant pressure until a desired amount of polymer is formed. After polymerization, unreacted monomers are removed from the reactor effluent emulsion or dispersion by vaporization at reduced pressure. Polymer is recovered from the emulsion or dispersion by coagulation.

The polymerization is generally conducted in the presence of a free radical initiator system, such as ammonium persulfate. The polymerization reaction may further include other components such as chain transfer agents and complexing agents. The polymerization is generally carried out at a temperature between 10° C. and 100° C., and preferably between 30° C. and 80° C. The polymerization pressure is usually between 0.3 MPa and 30 MPa, and preferably between 1 MPa and 10 MPa.

When conducting emulsion polymerization, perfluorinated, partially fluorinated, APFO (ammonium perfluorooctanate) free emulsifiers may be used, in addition to emulsifier-free polymerization. Generally these fluorinated emulsifiers comprise from about 0.02% to about 3% by weight with respect to the polymer. Polymer particles produced with a fluorinated emulsifier typically have an average diameter, as determined by dynamic light scattering techniques, between about 10 nm to about 300 nm, and preferably between about 50 nm and about 200 nm.

Such fluorinated and partially fluorinated emulsifiers include those commonly used in emulsion polymerization of fluorine containing monomers. Examples of such emulsifiers include fluoroalkyl, preferably perfluoroalkyl, carboxylic acids and salts thereof having 6-20 carbon atoms, preferably 6-12 carbon atoms, such as ammonium perfluorooctanoate (APFO) and ammonium perfluorononanoate. (See, e.g. U.S. Pat. No. 2,559,752).

Additional examples of such emulsifiers also include perfluorinated and partially fluorinated emulsifier having the formula $[R_f-O-L-COO^-]_iX^{i+}$ wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3. (See, e.g. U.S. Pat. No. 2007/0015864).

Additional examples of such emulsifiers also include perfluorinated polyether emulsifiers having the formula (I) or (II), where $CF_3-(OCF_2)_m-O-CF_2-X$ (I) wherein m has a value of 1 to 6 and X represents a carboxylic acid group or salt thereof, $CF_3-O-(CF_2)_3-(OCF(CF_3)-CF_2)_z-O-L-Y$ (II) wherein z has a value of 0, 1, 2 or 3, L represents a divalent linking group selected from $-CF(CF_3)-$, $-CF_2-$ and $-CF_2CF_2-$ and Y represents a carboxylic acid group or salt thereof. (See, e.g. U.S. Pat. Publ. No. 2007/0015865).

Further examples of such emulsifiers include perfluorinated polyether emulsifiers having the formula $R_f-O(CF_2CF_2O)_mCF_2COOA$ wherein $R_f$ is $C_nF_{(2n+1)}$; where n=1-4, A is a hydrogen atom, an alkali metal or $NH_4$, and m is an integer of from 1 to 3. (See, e.g. U.S. Pat. No. 2006/0199898). Additional examples of such emulsifiers also include perfluorinated emulsifiers having the formula $F(CF_2)_nO(CF_2CF_2O)_mCF_2COOA$ wherein A is a hydrogen atom, an alkali metal or $NH_4$, n is an integer of from 3 to 10, and m is 0 or an integer of from 1 to 3. (See, e.g. U.S. Pat. Publ. No. 2007/0117915).

Additional examples of such emulsifiers include fluorinated polyether emulsifiers as described in U.S. Pat. No. 6,429,258 and perfluorinated or partially fluorinated alkoxy acids and salts thereof wherein the perfluoroalkyl component of the perfluoroalkoxy has 4-12 carbon atoms, preferably 7-12 carbon atoms. (See, e.g. U.S. Pat. No. 4,621,116).

Other exemplary emulsifiers include partially fluorinated polyether emulsifiers having the formula $[R_f—(O)_t—CHF—(CF_2)_n—COO—]_iX^{i+}$ wherein $R_f$ represents a partially or fully fluorinated aliphatic group optionally interrupted with one or more oxygen atoms, t is 0 or 1 and n is 0 or 1, $X^{i+}$ represents a cation having a valence i and i is 1, 2 or 3. (See, e.g. U.S. Pat. Publ. No. 2007/0142541).

More exemplary emulsifiers include perfluorinated or partially fluorinated ether containing emulsifiers as described in U.S. Pat. Publ. Nos. 2006/0223924, 2007/0060699, 2007/0142513 and 2006/0281946.

The perfluorinated, partially fluorinated and/or APFO (ammonium perfluorooctanate) free emulsifiers can be removed or recycled from the fluoropolymers emulsion or dispersion as described in U.S. Pat. Nos. 5,442,097, 6,613,941, 6,794,550, 6,706,193 and 7,018,541.

In some embodiments, the polymerization process may be conducted with no fluorinated emulsifiers. Polymer particles produced without an emulsifier typically have an average diameter, as determined by dynamic light scattering techniques, between about 40 nm to about 500 nm, typically between about 200 nm and about 400 nm, whereas suspension polymerization will typically produce particles sizes up to several millimeters.

In some embodiments, liquid perfluoro ethers of Formula 1 and/or Formula 2 as previously disclosed can be pre-emulsified in water with the aid of a fluorinated emulsifier prior to copolymerization with gaseous fluorinated monomers. The pre-emulsification of the liquid fluorinated monomer preferably results in an emulsion having monomer droplets having a diameter of about 1 μm or more, with an expected range of about 1 μm to 20 μM as described in commonly-owned U.S. Pat. No. 6,677,414.

For coating applications, an aqueous dispersion of the fluoropolymer is desired and hence the fluoropolymer will not need to be separated or coagulated from the dispersion. To obtain a fluoropolymer dispersion suitable for use in coating applications such as, for example, in the impregnation of fabrics or in the coating of metal substrates to make for example cookware, it will generally be desired to add further stabilizing surfactants and/or to further increase the fluoropolymer solids. For example, non-ionic stabilizing surfactants may be added to the fluoropolymer dispersion. Typically these will be added thereto in an amount of 1 to 12% by weight based on fluoropolymer solids. Examples of non-ionic surfactants that may be added include

R1-O—[CH$_2$CH$_2$O]n-[R2O]m-R3 wherein R1 represents an aromatic or aliphatic hydrocarbon group having at least 8 carbon atoms, R2 represents an alkylene having 3 carbon atoms, R3 represents hydrogen or a C1-C3 alkyl group, n has a value of 0 to 40, m has a value of 0 to 40 and the sum of n+m being at least 2. It will be understood that in the above formula, the units indexed by n and m may appear as blocks or they may be present in an alternating or random configuration. Examples of non-ionic surfactants according to formula above include alkylphenol oxy ethylates such as ethoxylated p-isooctylphenol commercially available under the trade designation "TRITON" such as for example those available under the trade designation "TRITON X 100" wherein the number of ethoxy units is about 10 or the trade designation "TRITON X 114" wherein the number of ethoxy units is about 7 to 8. Still further examples include those in which R1 in the above formula represents an alkyl group of 4 to 20 carbon atoms, m is 0 and R3 is hydrogen. An example thereof includes isotridecanol ethoxylated with about 8 ethoxy groups and which is commercially available under the trade designation "GENAPOL X080" from Clariant GmbH. Non-ionic surfactants according to the above formula in which the hydrophilic part comprises a block-copolymer of ethoxy groups and propoxy groups may be used as well. Such non-ionic surfactants are commercially available from Clariant GmbH under the trade designation "GENAPOL PF 40" and "GENAPOL PF 80".

The amount of fluoropolymer solids in the dispersion may be upconcentrated as needed or desired to an amount between 30 and 70% by weight. Any of the known upconcentration techniques may be used including ultrafiltration and thermal upconcentration.

In some embodiments, a water soluble initiator can be used to start the polymerization process. Salts of peroxy sulfuric acid, such as ammonium persulfate, are typically applied either alone or sometimes in the presence of a reducing agent, such as bisulfites or sulfinates (disclosed in commonly-owned U.S. Pat. Nos. 5,285,002 and 5,378,782) or the sodium salt of hydroxy methane sulfinic acid (sold under the trade name RONGALIT, BASF Chemical Company, New Jersey, USA). Most of these initiators and the emulsifiers have an optimum pH-range where they show most efficiency. For this reason, sometimes buffers are used in some embodiments. Buffers include phosphate, acetate or carbonate buffers or any other acid or base, such as ammonia or alkali metal hydroxides. The concentration range for the initiators and buffers can vary from 0.01% to 5% by weight based on the aqueous polymerization medium.

In the present disclosure, an iodo-chain transfer agent is used in the polymerization process. Suitable iodo-chain transfer agent in the polymerization include the formula of $RI_x$, where (i) R is a perfluoroalkyl or chloroperfluoroalkyl group having 3 to 12 carbon atoms; and (ii) x=1 or 2. The iodo-chain transfer agent may be a perfluorinated iodo-compound. Exemplary iodo-perfluoro-compounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane and mixtures thereof.

The cure site monomers are derived from one or more compounds of the formula: a) $CX_2=CX(Z)$, wherein: (i) X each is independently H or F; and (ii) Z is I, Br, $R_f—U$ wherein U=I or Br and $R_f$=a perfluorinated or partially perfluorinated alkylene group optionally containing O atoms. In addition, non-fluorinated bromo- or iodo-olefins, e.g., vinyl iodide and allyl iodide, can be used. In some embodiments, the cure site monomers are derived from one or more compounds selected from the group consisting of $CH_2=CHI$, $CF_2=CHI$, $CF_2=CFI$, $CH_2=CHCH_2I$, $CF_2=CFCF_2I$, $CH_2=CHCF_2CF_2I$, $CF_2=CFCH_2CH_2I$, $CF_2=CFCF_2CF_2I$, $CH_2=CH(CF_2)_6CH_2CH_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3—OCF_2CF_2I$, $CH_2=CHBr$, $CF_2=CHBr$, $CF_2=CFBr$, $CH_2=CHCH_2Br$, $CF_2=CFCF_2Br$, $CH_2=CHCF_2CF_2Br$, $CF_2=CFOCF_2CF_2Br$ and mixtures thereof.

The iodo-chain transfer agents and/or the cure site monomers can be fed into the reactor by batch charge or continuously feeding. Because feed amount of chain transfer agent and/or cure site monomer is relatively small compared to the monomer feeds, continuous feeding of small amounts of chain transfer agent and/or cure site monomer into the reactor is difficult to control. Continuous feeding can be achieved by a blend of the iodo-chain transfer agent in one or more monomers. Exemplary monomers for such a blend include but are not limited to hexafluoropropylene (HFP) and perfluoromethyl vinyl ether (PMVE).

To coagulate the obtained fluoropolymer emulsion or dispersion, any coagulant which is commonly used for coagulation of a fluoropolymer emulsion or dispersion may be used, and it may, for example, be a water soluble salt such as calcium chloride, magnesium chloride, aluminum sulfate, potassium alum, aluminum chloride or aluminum nitrate, and/or an acid such as nitric acid, hydrochloric acid or sulfuric acid, or a base such as ammonia or alkali metal hydroxides or a water soluble organic liquid such as an alcohol or acetone. The amount of the coagulant to be added is preferably from 0.001 to 20 parts by mass, particularly preferably from 0.01 to 10 parts by mass per 100 parts by mass of the fluorinated elastomer emulsion or dispersion. Further, the fluorinated elastomer emulsion or dispersion can be coagulated by a mechanical shear such as high speed stirrer. The fluorinated elastomer emulsion or dispersion may be frozen for coagulation.

The coagulated fluorinated elastomer is preferably collected by filtration and washed with washing water. The washing water may, for example, be ion exchanged water, pure water or ultrapure water. The amount of the washing water may be from 1 to 5 times by mass to the fluorinated elastomer, whereby the amount of the emulsifier attached to the fluorinated elastomer can be sufficiently reduced by one washing.

Peroxide cure fluoroelastomers require a compounding process to add co-agents, peroxides and fillers such as carbon black. The typical compounding process is to use a two-roll mill. If the viscosity of raw or compounded gum is too low, raw or compounded gum will stick to the mill and it will be difficult to process. Surprisingly, fluoroelastomers of this invention do not stick to a roll mill significantly during compounding.

In some embodiments, the crosslinkable fluoropolymer composition can be Compounded with the curable component or mixed in one or several steps, using any of the usual rubber mixing devices such as internal mixers (e.g., Banbury mixers), roll mills, etc. For best results, the temperature of the mixture should not rise above about 120° C. During mixing it is necessary to distribute the components and additives uniformly throughout for effective cure.

The fluoroelastomer compositions can be used to form articles. The term "article" as used herein means a final article, such as an O-ring, and/or preforms from which a final shape is made, e.g. an extruded tube from which a ring is cut. To form an article, the fluoroelastomer composition can be extruded using a screw type extruder or a piston extruder. Alternatively, the fluoroelastomer composition can be shaped into an article using injection molding, transfer molding or compression molding.

The fluoroelastomer compositions can also be used to prepare solutions, which can be used to prepare cured and/or uncured coatings. Substrates that can be coated with these coatings include, but are not limited to, metals, glass, fabrics, polymers, and the like.

Uncured elastomers can be molded using any one of a number of techniques. In some embodiments, uncured elastomers are compression molded by placing a quantity of cold uncured elastomer mixture into a heated mold cavity and subsequently closing the mold using adequate pressure to shape the article. After retaining the elastomer at sufficient temperature during sufficient time to allow vulcanization to proceed, it can then be demolded.

In some embodiments, uncured elastomers are injection molded by first heating and masticating elastomer mixtures in an extruder screw and then collecting the elastomer mixtures in a heated chamber from which they are injected into a hollow mold cavity by means of a hydraulic piston. After vulcanization the article can then be demolded.

Advantages of injection molding process include short molding cycles, little or no preform preparation, little or no flash to remove, and low scrap rate. If the compound viscosity is low, the cylinder, barrel and screw temperature can be low and there is less risk to scorch during the flow into the mold. Also low compound viscosity can improve fill or injection time. Typical mold temperature is 170° C. to 220° C. and heating or molding time is 20 seconds to 3 minutes depending on parts thickness.

In some embodiments, the elastomer mixtures are transfer molded. Transfer molding is similar to injection molding with the difference being that the elastomer mixture is not preheated and masticated by an extruder screw but introduced as a cold mass in the heated injection chamber. Typical curing conditions for fluoroelastomer mixtures are elevated temperatures e.g. about 160° C. to about 210° C., pressures above 7 bar and maintaining these conditions for 30 seconds, in fast injection molding processes to 5 minutes or longer for larger compression molded articles.

Pressing of the compounded mixture (i.e., press cure) is typically conducted at a temperature of about 140 to 220° C., preferably about 150 to 190° C., for a period of about 1 minute to about 15 hours, usually for about 1 to 15 minutes. A pressure of about 700 to 20,000 kPa, preferably about 3400 to about 6800 kPa, is typically used in molding the composition. The molds first may be coated with a release agent and pre-baked.

The molded vulcanizate can be post cured in an oven at a temperature of about 150-320° C., preferably at a temperature of about 160-300° C., for a period of about 1-24 hours or more, depending on the type of polymer used and the cross-sectional thickness of the sample. For thick sections, the temperature during the post cure is usually raised gradually from the lower limit of the range to the desired maximum temperature. The maximum temperature used is typically about 300° C., and is held at this value for about 1 hour or more.

The amorphous fluoropolymer compound also includes a curing agent that enables vulcanization of the fluoropolymer. The curing agent may include curable materials, such as, for example, peroxide and one or more co-agents. Peroxide curatives include organic or inorganic peroxides. Organic peroxides are preferred, particularly those that do not decompose during dynamic mixing temperatures. Examples of non-limiting peroxides include dicumyl peroxide, 2,5-dimethyl-2,5-di(t-butylperoxy)hexane, di-t-butyl peroxide, t-butylperoxy benzoate, 2,5-dimethyl-2,5-di(t-butylperoxy)hexane-3 and lauryl peroxide. Other suitable peroxide curatives are listed in U.S. Pat. No. 5,225,504. The amount of peroxide curing agent used generally will be 0.1 to 5, preferably 1 to 3 parts by weight per 100 parts of fluoropolymer. Other conventional radical initiators are suitable for use with the present invention.

In peroxide cure systems, fluorocarbon polymers can be cured using an organic peroxide. It is often desirable to include a co-agent. Those skilled in the art are capable of selecting conventional co-agents based on desired physical properties. Non-limiting examples of such agents include tri(methyl)allyl isocyanurate (TMAIC), triallyl isocyanurate (TAIC), tri(methyl)allyl cyanurate, poly-triallyl isocyanurate (poly-TAIC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, etc. Another useful co-agent may be represented by the formula CH2=CH—$R_f$—CH=CH2 wherein $R_f$ may be a perfluoroalkylene of 1 to 8 carbon atoms. Such co-agents provide enhanced mechanical strength to the final cured elastomer. They generally are used in amount of 1 to 10 parts by weight, or preferably 1 to 5 parts by weight, per 100 parts of the fluorocarbon polymer.

Fluoropolymers, in particular VDF containing fluoroelastomers, may be cured using a polyhydroxy curing system. In such instance, it will not be required that the fluoropolymer includes cure site components. The polyhydroxy curing system generally comprises one or more polyhydroxy compounds and one or more organo-onium accelerators. The useful organo-onium compounds typically contain at least one heteroatom, i.e., a non-carbon atom such as N, P, S, O, bonded to organic or inorganic moieties. One useful class of quaternary organo-onium compounds broadly comprises relatively positive and relatively negative ions wherein a phosphorus, arsenic, antimony or nitrogen generally comprises the central atom of the positive ion. The negative ion may be an organic or inorganic anion (e.g., halide, sulfate, acetate, phosphate, phosphonate, hydroxide, alkoxide, phenoxide, bisphenoxide, etc.).

Many of the organo-onium compounds are disclosed. See, for example, commonly-owned U.S. Pat. Nos. 4,233,421, 4,912,171, 5,086,123, 5,262,490, and 5,929,169. A class of useful organo-onium compounds includes those having one or more pendent fluorinated alkyl groups. Generally, a most useful class of fluorinated onium compounds is disclosed in U.S. Pat. No. 5,591,804.

The polyhydroxy compound may be used in its free or non-salt form or as the anionic portion of a chosen organo-onium accelerator. The crosslinking agent may be any polyhydroxy compounds that function as a crosslinking agent or co-curative for fluoroelastomers, such as those polyhydroxy compounds disclosed in U.S. Pat. Nos. 3,876,654, and 4,233, 421. One of the most useful polyhydroxy compounds includes aromatic polyphenols such as 4,4'-hexafluoroisopropylidenyl bisphenol, known more commonly as bisphenol AF. The compounds 4,4'-dihydroxydiphenyl sulfone (also known as bisphenol S) and 4,4'-isopropylidenyl bisphenol (also known as bisphenol A) are also widely used in practice.

Fluoropolymers, in particular VDF containing fluoroelastomers, may also be cured using a polyamine curing system. Examples of useful polyamines include N,N-dicinnamylidene-1,6-hexanediamine, trimethylenediamine, cinnamylidene trimethylenediamine, cinnamylidene ethylenediamine, and cinnamylidene hexamethylenediamine. Examples of useful carbamates are hexamethylenediamine carbamate, bis(4-aminocyclohexyl)methane carbamate, 1,3-diaminopropane monocarbamate, ethylenediamine carbamate and trimethylenediamine carbamate. Usually about 0.1-5 phr of the diamine is used.

Additives such as carbon black, stabilizers, plasticizers, lubricants, fillers, and processing aids typically utilized in fluoropolymer compounding can be incorporated into the compositions, provided they have adequate stability for the intended service conditions. In particular, low temperature performance can be enhanced by incorporation of perfluoropolyethers. See, for example, U.S. Pat. No. 5,268,405. Carbon black fillers are typically also employed in fluoropolymers as a means to balance modulus, tensile strength, elongation, hardness, abrasion resistance, conductivity, and processability of the compositions. Suitable examples include MT blacks (medium thermal black) designated N-991, N-990, N-908, and N-907; FEF N-550; and large particle size furnace blacks. When used, 1 to 100 parts filler per hundred parts fluoropolymer (phr) of large size particle black is generally sufficient.

Fluoropolymer fillers may also be present in the compositions. Generally, from 1 to 100 phr of fluoropolymer filler is used. The fluoropolymer filler can be finely divided and easily dispersed as a solid at the highest temperature used in fabrication and curing of the inventive composition. By solid, it is meant that the filler material, if partially crystalline, will have a crystalline melting temperature above the processing temperature(s) of the curable composition(s). A preferred way to incorporate fluoropolymer filler is by blending latices. This procedure, including various kinds of fluoropolymer filler, is described in commonly-owned U.S. Pat. No. 6,720,360.

Conventional adjuvants may also be incorporated into the compound of the present invention to enhance the properties of the compound. For example, acid acceptors may be employed to facilitate the cure and thermal stability of the compound. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are preferably used in amounts ranging from about 1 to about 20 parts per 100 parts by weight of the polymer.

The following specific, but non-limiting, examples will serve to illustrate the invention. In these examples, all amounts are expressed in parts by weight, or parts by weight per one hundred parts by weight of rubber (phr). The monomer composition ratio was measured by $^1H/^{19}F$ cross-integration NMR analysis.

EXAMPLES

Example 1

In Example 1, a 4 liter reactor was charged with 2,250 grams of water, 33.3 grams of 30% aqueous solution of $CF_3OCF_2CF_2CF_2OCF_2COONH_4$, 1.1 grams of ammonium persulfate (APS, $(NH_4)_2S_2O_8$) and 8 grams of 50% aqueous solution of potassium phosphate dibasic ($K_2HPO_4$). The fluorinated emulsifier $CF_3OCF_2CF_2CF_2OCF_2COONH_4$ was prepared as described in U.S. Pat. Publ. No. 2007/0015864. The reactor was evacuated, the vacuum was broken and it was pressurized with nitrogen to 25 psi (0.17 MPa). This vacuum and pressurization was repeated three times. After removing oxygen, the reactor was heated to 80° C. and pressurized to 74 psi (0.51 MPa) with a blend of hexafluoropropylene (HFP) and 1,4-diiodooctafluorobutane (available from SynQuest Lab, Florida, USA). To prepare the blend of hexafluoropropylene (HFP) and 1,4-diiodooctafluorobutane, a 1-liter, stainless steel cylinder was evacuated and purged 3 times with $N_2$. After adding 1,4-diiodooctafluorobutane to the cylinder, HFP was added based on the amount of 1,4-diiodooctafluorobutane added. The blend was then attached to the reactor and was fed using a blanket of $N_2$. The blend contained 97 wt % of HFP and 3 wt % of 1,4-diiodooctafluorobutane. The reactor was then charged with vinylidene fluoride (VDF) and the above described blend of hexafluoropropylene (HFP) and 1,4-diiodooctafluorobutane, bringing reactor pressure to 228 psi (1.57 MPa). Total precharge of VDF and the blend of HFP and 1,4-diiodooctafluorobutane was 91.4 grams, and 156.7 grams, respectively. The reactor was agitated at 650 rpm. As reactor pressure dropped due to monomer consumption in the polymerization reaction, the blend of hexafluoropropylene (HFP) and 1,4-diiodooctafluorobutane, and VDF were continuously fed to the reactor to maintain the pressure at 228 psi (1.57 MPa). The ratio of the blend and VDF was 0.651 by weight. After 4.7 hours the monomer and blend feeds were discontinued and the reactor was cooled. The resulting dispersion had a solid content of 33.8 wt. % and a pH of 3.6. The dispersion particle size was 123 nm. For the coagulation, the same amount of a $MgCl_2$/DI water solution was added to the latex. The solution contained 1.25 wt. % $MgCl_2.6H_2O$. The latex was agitated and coagulated. About 4000 ml of DI water was added and agitated for 15 minutes to wash the crumb then the wash water was drained off. The crumb was washed four times, using a total of 16,000 ml of warm DI water and dried at 130° C. for 16 hours. The resulting fluoroelastomer raw gum had a Mooney viscosity of 1.6 with ML (1+10) at 100° C. The fluoroelastomer contained 75.6 mol % copolymerized units of VDF and 23.2 mol % HFP. The iodine end groups —$CF_2CH_2I$ was 0.59 mol %. The iodine content by neutron activation analysis (NAA) was 1.02 wt %. The number average molecular weight ($M_n$) was 30,260 as determined by light scattering GPC. The test results are summarized in Table 2.

In Table 2 glass transition temperature ($T_g$) was determined in accordance with ASTM D 793-01 and ASTM E 1356-98 by a Perkin-Elmer differential scanning calorimetry DSC Pyris 1 under a nitrogen flow. A DSC scan was obtained from –50° C. to 200° C. at 10° C./min. scan rate.

Mooney viscosity or compound Mooney viscosity was determined in accordance with ASTM D1646-06 TYPE A by a MV 2000 instrument (available from Alpha Technologies, Ohio, USA) using large rotor (ML 1+10) at 100° C. Results are reported in Mooney units.

two-roll mill (15.24 cm diameter) after completely cleaning the roll using methanol as the solvent. 100 grams of the gum was milled for ten seconds to make a band on the front roll mill. The revolution speeds of front and back roll were 32.1 rpm and 22.2 rpm, respectively. The gap between the front and back roll was 0.381 mm and the calculated shear rate of the rolls from the difference of the roll revolutions is 207.7 $s^{-1}$. The roll surface temperature before the milling was 21° C. The gum surface temperatures before and after milling were 23.2° C. and 29.9° C. respectively. Then the gum was cut using a mill knife and a tab (2 cm) was produced to measure the peel strength of the gum to the roll. A clamp was placed on the above mentioned tab and a pull type spring scale (available from Ohaus Corp., New Jersey, USA) was attached to the clamp to measure the peel strength. The angle of peeling the gum to the roll was maintained about 90° and the peeling rate was about 400 cm/min. Average peel strength (n=2) was 8.4 dN/cm.

Viscoelastic properties were measured using a dynamic mechanical analyzer, RPA 2000 instrument (available from Alpha Technologies, Ohio, USA) in accordance with ASTM D 6204-07. The storage modulus (G') was measured at 10% strain and the frequency ($\omega$) of 0.1-209 rad/sec. The temperature for these measurements was 25° C. The storage modulus data of the raw gum at 0.1 rad/s and 6.3 rad/s (1 Hz) were 47 and 410 kPa, respectively. The test results are summarized in Table 3.

Figure 2:
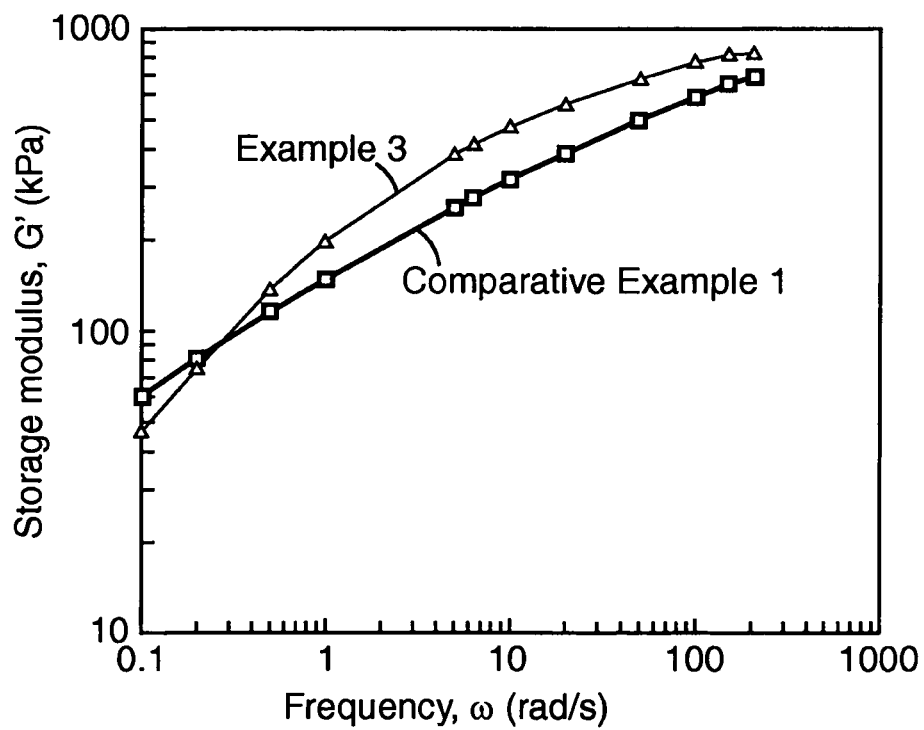
FIG. 2 is a double logarithmic plot showing the storage modulus (G') as a function of the frequency (ω) of the iodine containing amorphous fluoropolymer and commercially available amorphous fluoropolymer.

FIG. 2 shows storage modulus (log G') as the function of frequency (log $\omega$) at 25° C. There is a crossover point between

TABLE 2

|  | Mooney viscosity (ML 1 + 10) 100° C. | GPC | | | NMR (mol %) | | | iodine (wt %) | $T_g$ (° C.) |
| --- | --- | --- | --- | --- | --- | --- | --- | --- | --- |
|  |  | $M_n$ | $M_w$ | $M_w/M_n$ | VDF | HFP | —$CF_2CH_2I$ |  |  |
| Ex. 1 | 1.6 | 30,260 | 45,760 | 1.5 | 75.6 | 23.2 | 0.59 | 1.02 | −23.5 |
| Ex. 2 | 0.8 | 33,450 | 48,450 | 1.4 | 72.4 | 26.5 | 0.52 | 0.84 | −19.6 |

Example 2

In Example 2, the polymer sample was prepared and tested as in Example 1 except the reactor was pressurized to 90 psi (0.62 MPa) with the blend of hexafluoropropylene (HFP) and 1,4-diiodooctafluorobutane ($I(CF_2)_4I$) was used. Total precharge of VDF and the blend of HFP and 1,4-diiodooctafluorobutane was 75.4 grams, and 203.5 grams, respectively. The reaction time was 5.4 hours and the solid content was 35.1 wt %. The test results are summarized in Table 2.

FIG. 1 shows Mooney viscosity as the function of temperature at 25° C. to 100° C.

Example 3

In Example 3, the fluoroelastomer raw gum in Example 1 was used for a tackiness or peel strength test to a 6 inch Example 3 and Comparative Example 1 at 0.2-0.3 rad/s. The storage modulus of Example 3 is lower than that of Comparative Example 1 at low frequency (<0.3 rad/s), but the storage modulus of Example 3 is higher than that of Comparative Example 1 at high frequency (>0.3 rad/s). This indicates that Example 3 is softer than Comparative Example 1. However, the tackiness of Example 3 may not be higher than that of Comparative Example 1 because the storage modulus of Example 3 at 6.3 rad/s (1 Hz) is higher than that of Comparative Example 1 and the storage modulus of Example 3 exceeded the Dahlquist criterion (G'<300 kPa) while the storage modulus of Comparative Example 1 did not. This is confirmed by the peel strength tests as in Table 3.

TABLE 3

|  | Raw gum | Mooney viscosity (ML1 + 10)@100° C. | Storage modulus G' (kPa) | | Peel strength (dN/cm) |
| --- | --- | --- | --- | --- | --- |
|  |  |  | 0.1 (rad/s) | 6.3 (rad/s) |  |
| Ex. 3 | fluoroelastomer Ex. 1 | 1.6 | 47 | 410 | 8.4 |
| Ex. 4 | fluoroelastomer Ex. 2 | 0.8 | 47 | 436 | 6.8 |
| Ex. 5 | fluoroelastomer Ex. 5 blend | 70 | 331 | 703 | 0.4 |

TABLE 3-continued

|  | Raw gum | Mooney viscosity (ML1 + 10)@100° C. | Storage modulus G' (kPa) 0.1 (rad/s) | Storage modulus G' (kPa) 6.3 (rad/s) | Peel strength (dN/cm) |
|---|---|---|---|---|---|
| Co. Ex. 1 | fluoroelastomer Co. Ex. 1 | 2.7 | 61 | 287 | 22 |
| Co. Ex. 2 | fluoroelastomer Co. Ex. 2 | 20 | 228 | 582 | 7.4 |
| Co. Ex. 3 | fluoroelastomer Co. Ex. 3 | 88 | 290 | 691 | 1.8 |
| Co. Ex. 4 | fluoroelastomer Co. Ex. 4 | <23* | 4.6 | 62.3 | — |

*measured at 25° C.

Example 4

In Example 4, the fluoroelastomer raw gum sample was prepared and tested as in Example 3 except the fluoroelastomer raw gum prepared in Example 2 was used as the fluoroelastomer. The test results are summarized in Table 3.

Example 5

In Example 5, the fluoroelastomer raw gum compound sample was prepared and tested as in Example 3 except a 5%/95% blend of the fluoroelastomer raw gum prepared in Example 1 and peroxide curable fluoroelastomer FC 2260 (bromine content=0.45 wt %, Mooney viscosity ML1+10 @100° C.=88, available from Dyneon LLC, Minnesota, USA) was used as the fluoroelastomer. The blend was prepared by mixing the fluoroelastomer in Example 1 with FC 2260 using a two roll mill. Mooney viscosity (ML1+10) at 100° C. was 70. The test results are summarized in Table 3.

Comparative Example 1

In Comparative Example 1, the fluoroelastomer raw gum sample was prepared as in Example 3 except a 50%/50% blend of FC 2211 (Mooney viscosity ML1+10 @100° C.=20, available from Dyneon LLC, Minnesota, USA) and FC 2210X (viscosity @105° C.=20,000 mPa·s, available from Dyneon LLC, Minnesota, USA) was used as fluoroelastomer. The raw gum stuck to the roll significantly and it was difficult to create a tab for peel strength measurement. The test results are summarized in Table 3.

Comparative Example 2

In Comparative Example 2, the fluoroelastomer sample was prepared and tested as in Example 3 except FC 2211 was used as fluoroelastomer. The test results are summarized in Table 3.

Comparative Example 3

In Comparative Example 3, the fluoroelastomer sample was prepared and tested as in Example 3 except peroxide curable fluoroelastomer FC 2260 was used as fluoroelastomer. The test results are summarized in Table 3.

Comparative Example 4

In Comparative Example 4, the fluoroelastomer gum sample was tested as in Example 3 except FC 2210X was used as fluoroelastomer and Mooney viscosity was measured at 25° C. because the viscosity was too low at 100° C. The gum was very sticky, but the peel strength to the roll was unable to be measured because the gum itself does not have cohesive strength. The test results are summarized in Table 3.

Example 6

In Example 6, a fluoroelastomer compound was prepared using a 6" two roll mill by compounding the fluoroelastomer prepared in Example 1 with 30 parts of carbon black (available as Thermax MT, ASTM N990 from Cancarb, Medicine Hat, Alberta, Canada), 3 parts of zinc oxide (available as UPS-1 from Zinc Corporation of America), 2 parts of 50% active 2,5-dimethyl-2,5-di(t-butylperoxy)-hexane (available as Varox® DBPH-50 from R.T. Vanderbilt, Connecticut, USA), and 3 parts of triallylisocyanurate (TAIC) co-agent (98%, available as TAIC from Nippon Kasei, Japan). The compound formulation is shown in Table 4. During compounding the polymer was easy to process and the compound did not stick to the roll mill. Compound Mooney viscosity (ML1+10) at 100° C. was 1.9.

The cure rheology of the samples was investigated by testing uncured, compounded mixtures using the Alpha Technology RPA 2000 with MDR (Moving Disk Rheometer) mode and the procedure described in ASTM D 5289-95. The fluoroelastomer compound in this example exhibited good curing properties.

The compound was press-cured for 5 minutes using a 15×15 cm, 2 mm thick mold at 177° C. Then the press-cured sheet was post cured at 230° C. for 4 hours. The dumbbells for physical properties were cut from the cured sheets with ASTM Die D. The press-cured and post-cured samples were tested for physical properties in accordance with ASTM D 412-06a.

The same compound was also press-cured using a 214 O-ring (AMS AS568) mold at 177° C. for 5 minutes. Then the press-cured O-rings were post cured at 230° C. for 4 hours. The press-cured and post-cured O-rings were tested for compression set for 22 hours at 200° C. in accordance with ASTM D 395-03 Method B and ASTM D 1414-94. Results are reported as percentages. The test results are summarized in Table 5.

TABLE 4

|  | Compound (phr*) |
|---|---|
| Fluoroelastamer | 100 |
| N990 | 30 |
| ZnO | 3 |
| TAIC (98%) | 3 |
| DBPH-50 | 2 |

*phr; parts by weight per one hundred parts by weight of rubber

TABLE 5

| | Compound Mooney viscosity (ML 1 + 10) 100° C. | Cure rheology MDR 10 min@177° C. | | Press cure 5 min@177° C. | | Post cure 4 hours@230° C. | | Compression set 22 hours@ 200° C. | |
|---|---|---|---|---|---|---|---|---|---|
| | | t90 (min) | MH-ML (dNm) | Tensile (MPa) | Elongation (%) | Tensile (MPa) | Elongation (%) | press cure (%) | post cure (%) |
| Ex. 6 | 1.9 | 1.1 | 17.4 | 13.4 | 216 | 18.1 | 193 | 29 | 20 |
| Ex. 7 | 2.1 | 1.0 | 17.7 | 9.7 | 187 | 19.3 | 229 | 28 | 19 |
| Ex. 8 | 85 | 2.9 | 12.1 | 11.7 | 258 | 18.3 | 426 | 49 | 28 |
| Co. Ex. 5 | 3.1 | no cure | | — | — | — | — | — | — |
| Co. Ex. 6 | 26 | no cure | | — | — | — | — | — | — |
| Co. Ex. 7 | 97 | 3.7 | 13.1 | 11.8 | 306 | 18.1 | 275 | 48 | 23 |
| Co. Ex. 8 | 22 | 0.9 | 14.9 | 10.8 | 554 | 19.3 | 519 | 51 | 72 |

Example 7

In Example 7, the compound sample was prepared and tested as in Example 6 except the fluoroelastomer samples prepared in Example 2 were used as the fluoroelastomer. During compounding the polymer was easy to process and the compound did not stick to the roll mill as Example 6. Compound Mooney viscosity (ML1+10) at 100° C. was 2.1.

Example 8

In Example 8, the compound sample was prepared and tested as in Example 6 except the fluoroelastomer samples prepared in Example 5 were used as the fluoroelastomer. During compounding the polymer was easy to process and the compound did not stick to the roll mill as Example 6. Compound Mooney viscosity (ML1+10) at 100° C. was 85. The test results are summarized in Table 5.

Comparative Example 5

In Comparative Example 5, the compound sample was prepared as in Example 6 except a 50/50% blend of FC 2211 and FC 2210X was used as fluoroelastomer. During compounding the compound was difficult to process and to remove from the roll mill. Compound Mooney viscosity of the blend (ML1+10) at 100° C. was 3.1. Because this polymer does not contain iodine or bromine as the end groups or cure site, the compound did not cure with the formulation as in Table 4.

Comparative Example 6

In Comparative Example 6 except FC 2211 was used as fluoroelastomer. During compounding the compound was slightly difficult to remove from the roll mill. Compound 5, the compound sample was prepared and tested as in Example 6. Mooney viscosity (ML1+10) at 100° C. was 26. Because this polymer does not contain iodine or bromine as the end groups or cure site, the compound did not cure with the formulation as in Table 4.

Comparative Example 7

In Comparative Example 7, the compound sample was prepared and tested as in Example 6 except peroxide curable fluoroelastomer FC 2260 was used as fluoroelastomer. During compounding the polymer was easy to process and the compound did not stick to the roll mill as Example 6.

Comparative Example 8

In Comparative Example 8, the compound sample was tested as in Example 6. The compound was prepared using peroxide curable silicone elastomer Elastsil® 401 (Mooney viscosity ML1+10 @100° C.=22 available from Wacker Chemical Corp., Michigan, USA) with 1 part of 50% active 2,5-dimethyl-2,5-di(t-butylperoxy)-hexane (available as Varox® DBPH-50 from R.T. Vanderbilt, Connecticut, USA). During compounding the polymer was easy to process and the compound did not stick to the roll mill as Example 6.

Example 9

In Example 9, the fluoroelastomer compound in Example 6 was used for a tackiness or peel strength test to a 6" two-roll mill after completely cleaning the roll using methanol as the solvent. The 100 grams of compound was milled for ten seconds to make a band on the roll mill. The revolution speeds of the rolls and the gap between the rolls were the same as in Example 3. The compound surface temperatures before and after milling were 23.2° C. and 30.2° C. respectively. The peel strength was measured as in Example 3. Average peel strength (n=2) was 1.9 dN/cm. The test results are summarized in Table 6.

Viscoelastic properties of the compound were measured as in Example 3. The storage modulus data of the compound at 0.1 rad/s and 6.3 rad/s were 63 and 642 kPa, respectively. The test results are summarized in Table 6.

Examples 10 and 11, and Comparative Examples 8 to 11

In Examples 10 and 11, and Comparative Examples 8 to 11, the compound samples were tested as in Example 9 except the elastomer compounds in Examples 7, 8 and Comparative Examples 5 to 8 were used. The test results are summarized in Table 6.

TABLE 6

| | Compound | Compound Mooney viscosity (ML1 + 10)@100° C. | Storage modulus G' (kPa) @25° C. | | Peel strength (dN/cm) |
|---|---|---|---|---|---|
| | | | 0.1 (rad/s) | 6.3 (rad/s) | |
| Ex. 9 | fluoroelastomer Ex. 6 | 1.9 | 63 | 642 | 1.9 |
| Ex. 10 | fluoroelastomer Ex. 7 | 2.1 | 53 | 642 | 2.1 |
| Ex. 11 | fluoroelastomer Ex. 8 | 85 | 625 | 1373 | 0.3 |
| Co. Ex. 9 | fluoroelastomer Co. Ex. 5 | 3.1 | 103 | 449 | 12.9 |
| Co. Ex. 10 | fluoroelastomer Co. Ex. 6 | 26 | 341 | 1028 | 9.1 |

TABLE 6-continued

| Compound | Compound | Mooney viscosity (ML1 + 10)@100° C. | Storage modulus G' (kPa) @25° C. | | Peel strength (dN/cm) |
|---|---|---|---|---|---|
| | | | 0.1 (rad/s) | 6.3 (rad/s) | |
| Co. Ex. 11 | fluoroelastomer Co. Ex. 7 | 97 | 641 | 1312 | 1.2 |
| Co. Ex. 12 | silicone elastomer Co. Ex. 8 | 22 | 34 | 226 | 2.3 |

The data in Table 6 show that the fluoroelastomer compound (Examples 9 and 10) of this invention does not stick to the roll mill significantly compared with fluoroelastomer compound (Comparative Example 9). The tackiness of the fluoroelastomer compounds (Examples 9 and 10) is almost the same as that of silicone elastomer compound (Comparative Example 12).

Comparative Example 13

In Comparative Example 13, the peel strength was measured as in Example 3 except a pressure sensitive tape (available as PTFE tape #5490 from 3M, St. Paul, Minn., U.S.A.) was used to check adhesion to the roll as a control. The tape stuck to the roll well. The peel strength was 26.7 dN/cm.

Example 12

In Example 12, a 4 liter reactor was charged with 2,250 grams of water, 2 grams of ammonium persulfate (APS, $(NH_4)_2S_2O_8$) and 8 grams of 50% aqueous solution of potassium phosphate dibasic ($K_2HPO_4$). The reactor was evacuated, the vacuum was broken and it was pressurized with nitrogen to 25 psi (0.17 MPa). This vacuum and pressurization was repeated three times. After removing oxygen, the reactor was heated to 80° C. and pressurized to 74 psi (0.51 MPa) with a blend of hexafluoropropylene (HFP) 1,4-diiodooctafluorobutane and decafluoro-3-methoxy-4-trifluoromethyl-pentane (a hydrofluoroether, which is available as HFE 7300 from 3M, St. Paul, Minn., USA). To prepare the blend of hexafluoropropylene (HFP), 1,4-diiodooctafluorobutane and HFE 7300, a 1-liter, stainless steel cylinder was evacuated and purged 3 times with $N_2$. After adding 1,4-diiodooctafluorobutane and HFE 7300 to the cylinder, HFP was added based on the amount of 1,4-diiodooctafluorobutane added. The blend was then attached to the reactor and was fed using a blanket of $N_2$. The blend contained 92.3 wt % of HFP, 2.6 wt % of 1,4-diiodooctafluorobutane and 5.1 wt % of HFE 7300. The reactor was then charged with vinylidene fluoride (VDF) and the above described blend of hexafluoropropylene (HFP), 1,4-diiodooctafluorobutane and HFE 7300, bringing reactor pressure to 228 psi (1.57 MPa). Total precharge of VDF and the blend of HFP, 1,4-diiodooctafluorobutane and HFE 7300 was 93.0 grams, and 173.7 grams, respectively. The reactor was agitated at 650 rpm. As reactor pressure dropped due to monomer consumption in the polymerization reaction, the blend of hexafluoropropylene (HFP), 1,4-diiodooctafluorobutane and HFE 7300, and VDF was continuously fed to the reactor to maintain the pressure at 228 psi (1.57 MPa). The ratio of the blend and VDF was 0.651 by weight and no emulsifier was used for the polymerization. After 7.7 hours the monomer and blend feeds were discontinued and the reactor was cooled. The resulting dispersion had a solid content of 30.8 wt. % and a pH of 3.3. The dispersion particle size was 412 nm and total amount of dispersion was 3,906 grams. For the coagulation, an amount of D.I. water equal to one-to-two times the volume of latex was added to the latex. The mixture was agitated with a high-shear agitator at 8,200 rpm for 30 minutes and then the mother liquor was drained off. The crumb was washed four times, using a total of 16,000 ml of warm D.I. water and dried at 130° C. for 16 hours. The resulting fluoroelastomer raw gum was tested as described in Example 1 and had a Mooney viscosity of 1.5 at 100° C. and 0.7 at 121° C. The fluoroelastomer by NMR analysis contained 78.2 mol % copolymerized units of VDF and 20.5 mol % HFP and the iodine end groups —$CF_2CH_2I$ was 0.53 mol %. The iodine content by neutron activation analysis (NAA) was 0.88 wt %. The number average molecular weight ($M_R$) and the weight average molecular weight ($M_w$) by GPC were 18,980 and 46,290, respectively. The glass transition temperature ($T_g$) by DSC was −23.8° C.

The viscoelastic properties were measured as in Example 3 and the storage modulus' (G') at 0.1 and 6.3 rad/sec. were 137 and 630, respectively.

The fluoroelastomer compound was prepared and tested as in Example 6 by compounding the fluoroelastomer raw gum in this example. The test results are summarized in Table 7 and the compound formulation is the same as in Table 4.

During compounding the polymer was easy to process and the compound did not stick to the roll mill. The compound Mooney viscosities (ML1+10) at 100° C. and 121° C. were 1.5 and 0.7, respectively. Also the cure rheology of the fluoroelastomer compound was tested at 150° C. for 20 minutes. The compound exhibited good curing properties and the 90% cure time (t'90) was 7.8 minutes and delta torque (MH-ML) was 16.9 lb-in (19 dNm).

Example 13

In Example 13, the polymer sample was prepared and tested as in Example 12 except iodopentafluoroethane ($CF_3I$) was used instead of 1,4-diiodooctafluorobutane ($I(CF_2)_4I$) and HFE7300was not used. The blend of HFP and iodotrifluoromethane in a cylinder was 1160 grams, and 13.7 grams, respectively. The reaction time was 6.1 hours and the solid content was 31.9 wt %. The resulting fluoroelastomer raw gum was tested as descried in Example 1 and had a Mooney viscosity of 2.5 at 100° C. and 1.2 at 121° C. The fluoroelastomer by NMR analysis contained 77.4 mol % copolymerized units of VDF and 21.7 mol % HFP and the iodine end groups —$CF_2CH_2I$ was 0.27 mol %. The iodine content by neutron activation analysis (NAA) was 0.43 wt %.

The peel strength (n=2) to the roll and the viscoelastic properties were measured as in Example 3. The strength was 5.1 dN/cm and the storage modulus' (G') at 0.1 and 6.3 rad/sec. were 97.7 and 534, respectively.

Comparative Example 14

In Comparative Example 14, a fluoroelastomer sample was tested as in Example 1 except G-802 (available from Daikin America, Orangeburg N.Y., USA) was used as fluoroelastomer. The raw gum had a Mooney viscosity of 49 at 100° C. and 23 at 121° C.

The viscoelastic properties were measured as in Example 3 and the storage modulus (G') at 0.1 and 6.3 rad/sec. were 326 and 625, respectively.

The fluoroelastomer compound sample was prepared and tested as in Example 2 except the fluoroelastomer in Comparative Example 3 was used as fluoroelastomer. During compounding the polymer was easy to process and the compound did not stick to the roll mill. The compound was tested as in Example 6 and the test results are summarized in Table 7.

TABLE 7

| | Compound Mooney viscosity (ML 1 + 10) | | Cure rheology MDR 12 min@177° C. | | Press cure 5 min@177° C. | | Post cure 4 hours@230° C. | | Compression set 22 hours@ 200° C. | |
|---|---|---|---|---|---|---|---|---|---|---|
| | 100° C. | 121° C. | t90 (min) | MH-ML (dNm) | Tensile (MPa) | Elongation (%) | Tensile (MPa) | Elongation (%) | press cure (%) | post cure (%) |
| Ex. 12 | 1.5 | 0.7 | 1.2 | 17.0 | 13.0 | 224 | 19.2 | 206 | 28 | 22 |
| Co. Ex. 14 | 49 | 23 | 1.0 | 18.9 | 16.7 | 453 | 22.8 | 386 | 23 | 19 |

Example 14

In Example 14, 20 wt % to 80 wt % solid fluoroelastomer compound solutions were prepared using a glass jar by shaking the fluoroelastomer compound prepared in Example 12 with 2-butanone (MEK) as the solvent. The solution viscosity was measured using Brookfield viscometer DVII (available form Brookfield Engineering Laboratories, Middleboro, Mass., USA) at 21° C. The solution viscosities are shown in Table 8.

Comparative Example 15

In Comparative Example 15, the fluoroelastomer compound solution was prepared and tested as in Example 13 except the compound in Comparative Example 4 was used instead of the compound in Example 13. The solution viscosities are shown in Table 8.

Comparative Example 16

In Comparative Example 16, 20 wt % to 80 wt % solid fluoroelastomer compound solutions were prepared using a glass jar by shaking the fluoroelastomer compound prepared in Comparative Example 12 as in Example 14. 80% solid fluoroelastomer compound did not dissolve completely after shaking for one day and insoluble fluoroelastomer compound remained in the glass jar. The solution viscosities were measured as in Example 3. The solution viscosities are shown in Table 8.

TABLE 8

| | Solution viscosity (mPa · s) | | |
|---|---|---|---|
| Solid (%) | Ex. 13 | Co. Ex. 15 | Co. Ex 165 |
| 20 | 10 | 8 | 29 |
| 30 | 30 | 25 | 186 |
| 50 | 210 | 160 | 4,823 |
| 80 | 45,170 | 54,168 | — |

Example 15

In Example 15, the 80 wt % solid fluoroelastomer solution as prepared in Example 13 was coated onto a stainless steel coupon. The surface of the stainless steel was pretreated with 6.7% a silane coupling agent (available under the trade designation Chemlok® 5150 from Lord Corp., Cary, N.C., USA) in methanol as the primer after wiping the stainless steel surface with acetone. The coated sheet was dried at 120° C. for 10 minutes and cured at 150° C. for 20 minutes. The coating layer thickness after curing was 3.3 mm. Peel or adhesion strength was measured in accordance with ASTM D 429-03 Method B (90° stripping test). The peel or adhesion strength was 3.0 lb/in (53 dN/cm) and the type of adhesion failure was in the fluoroelastomer.

To facilitate testing of the adhesion between the layers via a 90° stripping test, a PTFE tape as in Comparative Example 12 was used to cover about 2 cm along one edge of the on the stainless steel before heating. The PTFE did not adhere to the fluoroelastomer layer and was used only to create tabs of the coating layer to insert into the jaws of a test device. A tester sold under the trade designation "Instron Model 4204" (available from Instron Corp., Norwood, Mass.) with an upgrade sold under the trade designation "MTS ReNew" (available from MTS System Corp., Eden Prairie, Minn.), at 100 mm/min crosshead speed was used as the test device. As the layers were separated the peel strength of the middle 80% of the sample measured. The values from the first 10% and the last 10% distance of the crosshead were omitted.

Example 16

In Example 16, a sheet about 1.78 mm thick of the fluoroelastomer compound in Example 12 was made by adjusting the gap of the roll mill. The fluoroelastomer compound sheet was applied onto a stainless steel coupon, which was pretreated with as in Example 15. Then the fluoroelastomer laminated coupon was heated in an oven (ambient pressure) at 150° C. for 20 minutes to evaluate the adhesion between the stainless steel and the fluoroelastomer. The fluoroelastomer layer flowed before curing and the surface of the fluoroelastomer was glassy and smooth. The average thickness of the fluoroelastomer layers was 1.54 mm. Peel or adhesion strength was measured as in Example 14 and the average strength (N=3) was 5.6 lb/in (98 dN/cm). The types of adhesion failure were all at the fluoroelastomer-primer or primer-metal interface.

Example 17

In Example 17, a 80 liter reactor was charged with 52,000 grams of water, 40 grams of ammonium persulfate (APS, $(NH_4)_2S_2O_8$) and 160 grams of 50% aqueous solution of potassium phosphate dibasic ($K_2HPO_4$). The reactor was evacuated, the vacuum was broken and it was pressurized with nitrogen to 25 psi (0.17 MPa). This vacuum and pressurization was repeated three times. After removing oxygen, the reactor was heated to 80° C. and pressurized to 74 psi (0.51 MPa) with a blend of hexafluoropropylene (HFP) 1,4-diiodooctafluorobutane and decafluoro-3-methoxy-4-trifluoromethyl-pentane. To prepare the blend of hexafluoropropylene (HFP), 1,4-diiodooctafluorobutane and HFE 7300, a 1-liter, stainless steel cylinder was evacuated and purged 3 times with $N_2$. After adding 1,4-diiodooctafluorobutane and HFE 7300 to the cylinder, HFP was added based on the amount of 1,4-diiodooctafluorobutane added. The blend was then attached to the reactor and was fed using a blanket of $N_2$. The blend contained 92.3 wt % of HFP, 2.6 wt % of 1,4-diiodooctafluorobutane and 5.1 wt % of HFE 7300. The reactor was then charged with vinylidene fluoride (VDF) and the above described blend of hexafluoropropylene (HFP), 1,4-diiodooctafluorobutane and HFE 7300, bringing reactor pressure to 220 psi (1.52 MPa). Total precharge of VDF and the blend of HFP, 1,4-diiodooctafluorobutane and HFE 7300 was 93.0 grams, and 173.7 grams, respectively. The reactor was agitated at 450 rpm. As reactor pressure dropped due to monomer consumption in the polymerization reaction, the blend of hexafluoropropylene (HFP), 1,4-diiodooctafluorobutane and HFE 7300, and VDF was continuously fed to the reactor to maintain the pressure at 220 psi (1.52 MPa). The ratio of the blend and VDF was 0.651 by weight and no emulsifier was used for the polymerization. After 6.5 hours the monomer and blend feeds were discontinued and the reactor was cooled. The resulting dispersion had a solid content of 30.7 wt. % and a pH of 3.4. The dispersion particle size was 257 nm and total amount of dispersion was 75,000 grams.

For the coagulation, 19.54 g of a mixture of 1 part by weight of $NH_4OH$ and 25 parts by weight of deionized water was added to 942 g of the latex made as described above. The pH of the mixture was 6.7. This mixture was added to 2320 mL of a 1.25 wt. % $MgCl_2$ in water solution. The crumb was recovered by filtering the coagulate through cheese cloth and gently squeezing to remove excess water. The crumb was returned to the coagulation vessel and rinsed with D.I. water a total of 3 times. After the final rinse and filtration, the crumb was dried in a 110° C. oven for 16 hours. The resulting fluoroelastomer raw gum was tested as descried in Example 1 and had a Mooney viscosity of 2.7 at 100° C.

The viscoelastic properties were measured as in Example 3 and the storage modulus' (G') at 0.1 and 6.3 rad/sec. were 44.8 and 423, respectively.

The fluoroelastomer compound was prepared and tested as in Example 6 by compounding the fluoroelastomer raw gum in this example. The compound exhibited good curing properties and the 90% cure time (t'90) was 1.2 minutes and delta torque (MH-ML) was 15.6 lb-in (17.6 dNm).

Various modifications and alterations of this invention will become apparent to those skilled in the art without departing from the scope and spirit of this invention.

What is claimed is:

1. An iodine containing amorphous fluoropolymer composition comprising a first fluoropolymer having a cure site wherein the cure site is an iodine group derived from 1,4-diiodooctafluorobutane, and the cure site is present in an amount of from 0.25 to 1 mol %, further wherein the first fluoropolymer has a total weight percent of iodine of from 0.2 to 2 wt %, and further wherein the first fluoropolymer comprises repeating units derived from vinylidene difluoride and hexafluoropropylene and has a Mooney viscosity of 2 or less, ML 1+10, at 100° C. according to ASTM D1646-06 TYPE A, and further wherein the first fluoropolymer has a storage modulus at 25° C. and 6.3 rad/s of greater than or equal to 300 kPa and at 25° C. and 0.1 rad/s of less than or equal to 200 kPa.

2. An aqueous dispersion comprising the iodine containing amorphous fluoropolymer composition of claim 1.

3. A coating composition comprising the dispersion of claim 2.

4. The fluoropolymer composition according to claim 1 wherein the first fluoropolymer comprises at least one cure site monomer.

5. The fluoropolymer composition of claim 4 wherein the cure site monomer is selected from the group consisting of $CH_2$=CHI, $CF_2$=CHI, $CF_2$=CFI, $CH_2$=CHCH$_2$I, $CF_2$=CFCF$_2$I, $CH_2$=CHCF$_2$CF$_2$I, $CF_2$=CFCH$_2$CH$_2$I, $CF_2$=CFCF$_2$CF$_2$I, $CH_2$=CH(CF$_2$)$_6$CH$_2$CH$_2$I, $CF_2$=CFOCF$_2$CF$_2$I, $CF_2$=CFOCF$_2$CF$_2$CF$_2$I, $CF_2$=CFOCF$_2$CF$_2$CH$_2$I, $CF_2$=CFCF$_2$OCH$_2$CH$_2$I, $CF_2$=CFO(CF$_2$)$_3$—OCF$_2$CF$_2$I, $CH_2$=CHBr, $CF_2$=CHBr, $CF_2$=CFBr, $CH_2$=CHCH$_2$Br, $CF_2$=CFCF$_2$Br, $CH_2$=CHCF$_2$CF$_2$Br, $CF_2$=CFOCF$_2$CF$_2$Br.

6. The fluoropolymer composition according to claim 1 further comprising a filler.

7. The fluoropolymer composition according to claim 1 wherein the fluoropolymer first is peroxide curable.

8. The fluoropolymer composition according to claim 1 further comprising a peroxide and a coagent.

9. The fluoropolymer composition according to claim 1 further comprising at least a second amorphous fluoropolymer having a Mooney viscosity of greater than 2, ML 1+10 at 100° C. according to ASTM D1646.

10. The fluoropolymer composition according to claim 1 wherein the first fluoropolymer further comprises interpolymerized units derived from formal containing perfluorovinylethers.

11. The fluoropolymer composition according to claim 1 wherein the first fluoropolymer is formed by emulsifier-free polymerization.

12. The fluoropolymer composition according to claim 1 wherein the first fluoropolymer is polymerized with a buffer or ammonium hydroxide.

13. The fluoropolymer composition according to claim 1 wherein the first fluoropolymer is coagulated by shear or salt.

14. The fluoropolymer composition according to claim 1 wherein the first fluoropolymer is coagulated with adding salt and ammonium hydroxide.

15. A solution comprising the iodine containing amorphous fluoropolymer composition of claim 1.

16. A coating composition comprising the solution of claim 15.

* * * * *

UNITED STATES PATENT AND TRADEMARK OFFICE
CERTIFICATE OF CORRECTION

PATENT NO.         : 8,835,551 B2                                          Page 1 of 1
APPLICATION NO.    : 12/677198
DATED              : September 16, 2014
INVENTOR(S)        : Fukushi et al.

It is certified that error appears in the above-identified patent and that said Letters Patent is hereby corrected as shown below:

In the Specification

Column 6
Line 25-26, Delete "(ammonium perfluorooctanate)" and insert
-- (ammonium perfluorooctanoate) --, therefor.

Column 7
Line 21-22, Delete "(ammonium perfluorooctanate)" and insert
-- (ammonium perfluorooctanoate) --, therefor.

Signed and Sealed this
Seventeenth Day of February, 2015

Michelle K. Lee
*Deputy Director of the United States Patent and Trademark Office*